March 29, 1960

C. B. SLACK 2,931,024

DEVICE FOR ANALOGUE TO DIGITAL CONVERSION, AND COMPONENTS THEREOF

Filed April 5, 1957

Inventor
Charles B. Slack
By Morse & Altman

United States Patent Office 2,931,024
Patented Mar. 29, 1960

2,931,024

DEVICE FOR ANALOGUE TO DIGITAL CONVERSION, AND COMPONENTS THEREOF

Charles B. Slack, Winchester, Mass., assignor to Baird-Atomic, Inc., a corporation of Massachusetts Application April 5, 1957, Serial No. 650,990

14 Claims. (Cl. 340—347)

The present invention relates to computing devices and, more particularly, to devices for converting analogue data to digital form.

The nature of a computational problem determines whether it may be solved more expediently by an analogue or a digital device. It is often desirable to receive data in one form, e.g., analogue, and to use or express it in the other, e.g., digital. This may be done in a converter which expresses the voltage output of an analogue device in discrete numerical form. One type of converter is based upon a self balancing technique in which each quasi-instantaneous amplitude sampled from an analogue signal is measured by comparison with a logically programmed sequence of precision voltage components. To achieve accuracy in the digital representation of the analogue signal, accurate sampling of the signal and a short comparison time between the sample and the programmed precision components is necessary.

An object of the present invention is to provide, for measuring the quasi-instantaneous amplitude of an analogue signal by rapid and accurate comparison with a logically programmed sequence of predetermined precision voltages, a novel analogue-to-digital converter that operates at high speed and with great accuracy to represent polarity and numerical value on a novel arrangement of bi-stable flip-flop circuits.

Other objects of the present invention are to provide novel relationships among the following components which comprise a device of the foregoing type: polarity flip-flop means for producing a state representing the polarity of an analogue signal; a series of sequence flip-flop means for gating sequentially each digital component; comparator means for producing a signal denoting whether the magnitude of the analogue input or the magnitude of the prevailing combination of predetermined reference components is greater; clock means for generating a sequence of clock pulses of predetermined frequency; subtract means for generating subtract pulses in response to clock pulses selected under the control of the signal produced by the polarity flip-flop means and the signal produced by the comparator means; gate means for transmitting sequentially selected clock pulses and subtract pulses to sequentially selected polarity flip-flop means and sequence flip-flop means; current generator means for producing currents of a predetermined magnitude; and current switch means controlled by the signal produced by the polarity flip-flop means for applying each of the reference components to the comparator means.

A further object of the present invention is to provide, as a novel circuit that may constitute one of the foregoing components, a reliable single tube gate capable of passing two simultaneous input pulses independently of one another.

Other objects of the present invention will in part be obvious and will in part appear hereinafter.

The invention accordingly comprises the apparatus possessing the construction, combination of elements and arrangement of parts that are exemplified in the following detailed disclosure, the scope of which will be indicated in the appended claims.

For a fuller understanding of the nature and objects of the present invention, reference should be had to the following detailed description taken in connection with the accompanying drawings wherein.

Figure 1:
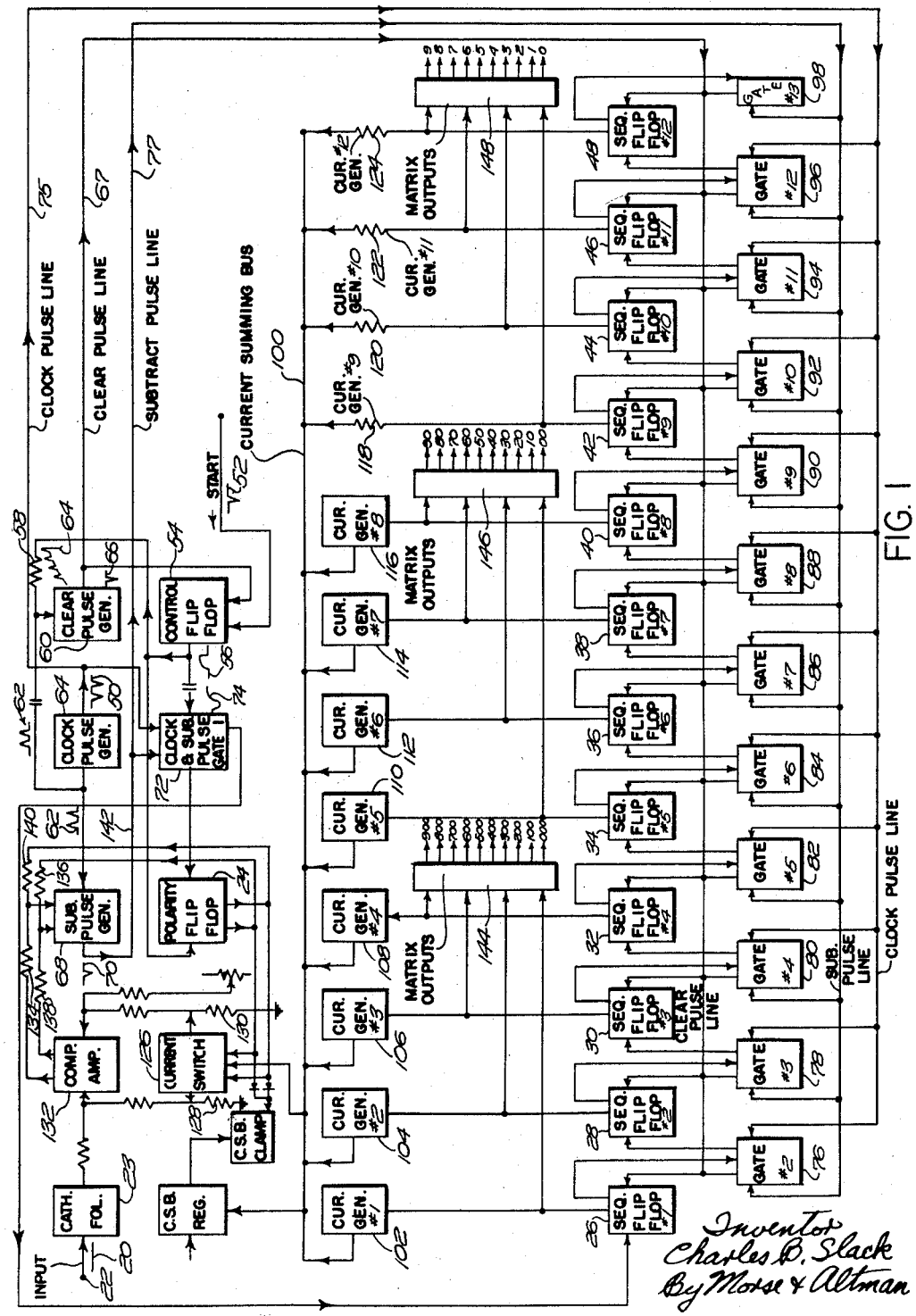
Figure 1 is a block diagram of a circuit embodying the present invention.

*The means for indicating polarity and digital value of analogue input—Fig. 1*

With reference to Fig. 1, an analogue input voltage 20 is applied at 22 to a cathode follower 23, each sample being compared to precision voltage components in a logically programmed sequence. These precision voltages are controlled by a sequence of flip-flops, now to be described, which switch precision currents through either of two precision resistors (depending upon input polarity) in response to a sequence of clock and subtract pulses. In the following discussion, for convenience, the state of a flip-flop will be indicated by "10" (one zero) when its left half, as shown in the drawings, is conducting and by a "01" (zero one) when its right half, as shown in the drawings, is conducting. In all, thirteen comparisons of decisions are required for each complete conversion, one for polarity, as indicated by the final state of a flip-flop 24, and four for each of three decimal digits, as indicated by the final states of flip-flops Nos. 1, 2, 3 and 4, indicated at 26, 28, 30 and 32, flip-flops Nos. 5, 6, 7 and 8, indicated at 34, 36, 38 and 40, and flip-flop Nos. 9, 10, 11, and 12, indicated at 42, 44, 46 and 48. The final states of each group of four flip-flops represent a digit in a 4-2-2-1 binary coded decimal notation. A decision consists of turning on a current by triggering the appropriate flip-flop by one of a sequence of clock pulses and then either leaving this current on or turning it off again, depending upon the direction of the unbalance between the comparison voltage and the input voltage. If it is required that the current be turned off, a subtract pulse is automatically generated simultaneously with the next clock pulse, and the same flip-flop is retriggered to its original state. The final states of the foregoing thirteen flip-flops are produced as follows.

*The means for initiating and timing the analogue to digital conversion—Fig. 1*

The operation of digitizing one of a series of quasi-instantaneous samples of analogue input voltage 20 is initiated by a negative start pulse 52 which triggers a control flip-flop 54 to state "01." The positively rising output 56 of control flip-flop 54 is applied through a resistor 58 to a clear pulse generator 60. Also applied to clear pulse generator 60 are positive clock pulses 62, produced by a clock pulse generator 64. These waveforms 56 and 62 combine to produce a composite waveform 64 that includes positive clock pulses of increasing peak voltage. Ultimately one of these clock pulses turns on clear pulse generator 60 to produce a clear pulse 66 on clear pulse line 67. The clear pulse then triggers control flip-flop 54 and sequencing flip-flops, numbers 1 through 12, to state "10." The resulting negative transition of output waveform 56, in addition to returning the clear pulse generator 60 to a cut-off state, is coupled to the first clock and subtract pulse gate 72, producing gating signal 74. This signal is both precisely timed and shaped so that the first clock and subtract pulse gate 72 is open at the time of the first clock pulse that occurs after the clear pulse. For convenience, the first clock pulse will be designated clock pulse No. 1, the first subtract pulse will be designated subtract pulse No. 1, and subsequent clock and subtract pulses suitably numbered in like manner. Clock pulse No. 1 is applied to first sequencing flip-flop 26, which having been triggered to state "10" by clear pulse 66, is now triggered to state "0.1." In addition, subtract pulse No. 1, if it occurs, is gated and applied to polarity flip-flop 24, which having been triggered to state "01" (the so-called "positive input" state) at the time of the clear pulse is now triggered to state "10," the so-called "negative input" state. Thus, clock pulse No. 2 is passed by gate No. 2 to trigger sequencing flip-flop No. 2 to state "01." Subtract pulse No. 2, if it occurs, is passed by gate No. 2 to retrigger sequencing flip-flop No. 1 to state "10." In similar fashion, subsequent sequencing flip-flops Nos. 3 through 12 are consecutively triggered by clock pulses 3 through 12 and, when appropriate, retriggered by the corresponding subtract pulses. The clock and subtract pulses are transmitted, respectively, by a clock pulse line 75 and a subtract pulse line 77 through gates Nos. 3 through 12 indicated at 76, 78, 80, 82, 84, 86, 88, 90, 92, 94, 96 and 98, respectively.

Associated with each sequencing flip-flop and controlled thereby is a current generator that when energized supplies a predetermined current to a current summing bus 100. The summing bus combines currents from all current generators energized at any given time. As shown, current generators, Nos. 1 through 8, shown at 102, 104, 106, 108, 110, 112, 114 and 116 are cathode followers controlled by sequencing flip-flops Nos. 1 through 8, respectively. Current generators, Nos. 9 through 12, shown at 118, 120, 122 and 124, respectively, are merely resistors capable of transmitting predetermined currents to current summing bus 100 from sequencing flip-flops Nos. 9 through 12, respectively.

As indicated above, the final digitized output is indicated by which of current generators Nos. 1 through 12 remain energized in response to the sequence of clock pulses that have triggered sequencing flip-flops Nos. 1 through 12 to "01" and which have been deenergized in response to the sequence of subtract pulses that have retriggered none or some of sequencing flip-flops Nos. 1 through 12 to "10."

*The means for effecting the sequence of comparisons between the analogue input and the sequence of precision voltages—Fig. 1*

Subtract pulses are produced by subtract pulse generator 68 only when appropriate relationships have been established between the precision current generated in current summing bus 100 by current generators Nos. 1 through 12 and the input voltage to be digitized. These relationships are established by polarity flip-flop 24 and a comparison amplifier 132, to be described in detail below. Current from current summing bus 100 is routed by current switch 126, under the control of polarity flip-flop 24 through a resistor 128 when input signal 20 is positive and a resistor 130 when input signal is negative. As indicated above, start pulse 52 gives rise to clear pulse 66 which initially sets polarity flip-flop 24 to state "01," the so-called positive input state. The D.C. push-pull output of comparison amplifier 132, determined initially only by the input polarity since all precision currents are then turned off, is combined with the D.C. push-pull output of polarity flip-flop 24 in two resistance adders that include resistors 134 and 136, and resistors 138 and 140. The two resulting outputs then are applied to subtract pulse generator 68. If input 20 is negative, the positive clock pulse from clock pulse generator 62 that immediately follows the clear pulse 66 causes subtract pulse generator 68 to introduce a subtract pulse 70 into a subtract pulse line 77. Thus, at the time of the first clock pulse, clock and subtract pulse gate 72 produces gating signal 74 which permits transmission of a negative pulse that retriggers polarity flip-flop 24 to state "10,"

the so-called negative state. Since gating signal 74 lasts only long enough to pass the first subtract pulse, subsequent subtract pulses, if they occur, do not affect polarity flip-flop 24 for the remainder of the analogue to digital conversion.

If D.C. input 20 had been positive, the push-pull output of balance amplifier 132 would have been opposite to the output resulting when input 20 was negative as above. Since polarity flip-flop 24 initially is in state "01," the resultant D.C. voltage applied to subtract pulse generator 68 would be sufficiently high to prevent transmission of a subtract pulse from subtract pulse generator 68. Thus, polarity flip-flop 24 would remain in the positive input signal state for the remainder of the analogue-to-digital conversion.

At the time that polarity flip-flop 24 is triggered into the state that is to last for the remainder of the analogue-to-digital conversion, the first clock pulse triggers sequencing flip-flop No. 1 to state "01," actuating current generator No. 1 which supplies current to current summing bus 100. As previously stated, this current, for a negative input, is directed through resistor 130 by current switch 126 which is in turn controlled by polarity flip-flop 24. If the potential applied to balance amplifier 132 by external input 20 is more negative than the potential which results from the flow of precision current through resistor 130, the output of balance amplifier 132 remains unchanged. Under these conditions, the combined outputs of polarity flip-flop 24 and balance amplifier 132 are such as to prevent subtract pulse generator 68 from producing a subtract pulse in response to the applied clock pulse No. 2. In consequence, sequencing flip-flop 26 remains in state "01" and current generator 102 remains in its current generating state for the remainder of the conversion. Thereafter, sequencing flip-flop No. 1 applies a gating pulse to gate No. 2 which transmits the next clock pulse to sequencing flip-flop No. 2. In consequence, current generator No. 2 introduces an additional component of current into current summing bus 100. Once again, if the combined outputs of polarity flip-flop 24 and the comparison amplifier 132 are such as to prevent subtract pulse generator 68 from producing subtract pulse No. 3, sequencing flip-flop No. 2 remains in state "01" and current generator No. 2 remains in its current generating state for the remainder of the conversion. However, if the additional current is sufficient to cause the potential developed across resistor 130 to exceed the negative input, the comparison amplifier output will switch, and as previously described, subtract pulse No. 3 in response to positive clock pulse No. 3. This subtract pulse No. 3 will then retrigger sequencing flip-flop No. 2 to its original state, turning off the second component of precision current. The entire conversion continues in this way until the summation of the component currents generated in current summing bus 100 come as close as possible to producing a voltage drop across resistor 130 that equals input voltage 20.

Thus, the polarity and three-place digital value of input voltage 20 are represented by the final states of polarity flip-flop 24 and sequencing flip-flops Nos. 1 through 12. Since each digit here is represented by binary coded decimal or 4-2-2-1 notation, it is desirable to transform this notation to straight decimal notation in order to drive recording units, etc. This is done by three resistance matrices 144, 146 and 148 which are driven by sequencing flip-flops Nos. 1 through 4, Nos. 5 through 8 and Nos. 9 through 12, respectively.

Figure 2:
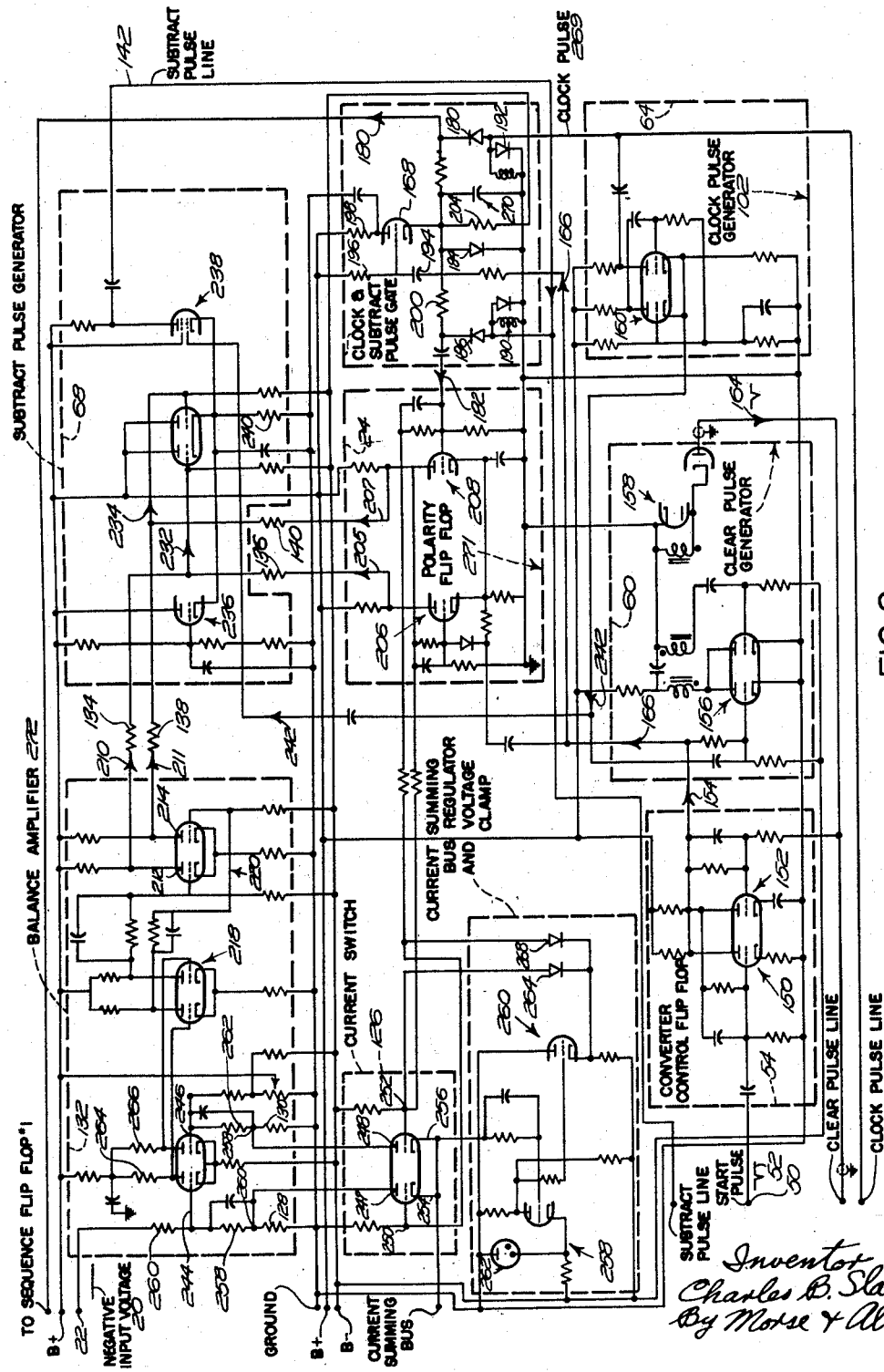
Fig. 2 is a schematic diagram of important details of the circuit of Fig. 1.

*The converter control flip-flop—Fig. 2*

Details of the most significant components of the circuit of Fig. 1 appear in Fig. 2. As indicated above, converter control flip-flop 54 is triggered by a start pulse 52 to state "10." As shown, converter control flip-flop 54, in conventional fashion, includes two resistor-capacitor coupled stages 150 and 152, the plate voltage of each of which is applied to the control grid of the other. Converter control flip-flop 54 is capable of two steady states depending on which of its two stages is conducting and externally controlled by negative pulses applied to one or the other of the grids of its two stages.

*The clear pulse generator—Fig. 2*

As indicated above, the output of converter control flip-flop 54 is applied, as at 154, to clear pulse generator 60 which is a blocking oscillator 156 coupled to an overshoot clipping diode 158.

*The clock pulse generator—Fig. 2*

As indicated above, also applied to clear pulse generator 60 are positive clock pulses that originate in clock pulse generator 64. Clock pulse generator 64 is a free running multi-vibrator conventionally including two resistor-capacitor coupled stages 160 and 162, the plate voltage of each of which is applied to the control grid of the other. Clock pulse generator 64 properly times the production of a clear pulse, applied as at 164, which retriggers converter control flip-flop 54 (and sequencing flip-flops Nos. 1 through 12, as shown in Fig. 1) to state "10." In addition the negative transition from control flip-flop 54 triggers the polarity flip-flop 271 to state "01," the so-called positive input state.

*The clock and subtract pulse gate—Fig. 2*

As indicated above, clear pulse 164 triggers the converter-control flip-flop 54 to state "10." The resulting negative transition is coupled, as at 154 and 156, to clock and subtract pulse gate 72, referred to as sequence gate No. 1. The purpose is to generate a sequence gating signal No. 1 in the cathode of triode 168 which lasts long enough to "embrace" clock pulse No. 1 (and subtract pulse No. 1 if it occurs) but returns to its original D.C. level before the occurrence of clock pulse No. 2 (and subtract pulse No. 2 if it occurs). The operation of this sequence gate No. 1 is as follows. Normally the cathode of triode 168 is clamped at ground by diode 184. Since the grid of 168 is returned to B+ by resistor 196, the tube conducts several milliamperes of current at a slightly positive bias voltage. The plates of diodes 186 and 188 also are returned to ground through inductors 190 and 192 respectively. Therefore, negative pulses occurring on clock pulse line 269 are prevented from triggering sequence flip-flop No. 1 via line 180 since negative pulses would only tend to cut off diode 188. Similarly, negative pulses on the subtract pulse line, should they occur, are inhibited by diode 186. The aforementioned negative transition from converter-control flip-flop 54 is capacitively coupled to the grid of triode 168, which, by virtue of grid current is normally clamped at approximately zero volts. The negative transition causes the triode to become cut off whereupon the cathode voltage decreases toward B— at a rate determined by resistor 204 and capacitor 270. The grid voltage immediately begins to recover toward B+ at a rate determined by capacitor 194 and resistor 196. The latter time constant is chosen such that the grid voltage returns to the zero clamp voltage in slightly less than 2 clock pulse periods. Accurate timing in this instance is assured by tying resistor 196 to B+ rather than to ground. The cathode naturally follows the grid since conduction again takes place. The combination of grid and cathode time constants provides proper shaping of the aforementioned sequence gating signal No. 1. Thus, at the time of clock pulse No. 1 (and subtract pulse No. 1 if it occurs), sequence gating signal No. 1 is at its most negative potential. Now diodes 186 and 188 both represent very low impedances since they are conducting several milliamperes of current in the forward direction. In this case, clock pulse No. 1 is allowed to pass through diode 188 and trigger sequence flip-flop No. 1. Similarly, subtract pulse No. 1, if it occurs, can pass through diode 186 and trigger the polarity flip-flop section 208.

In order to explain the specific circuitry of comparison amplifier 272, subtract pulse generator 68, polarity flip-flop 271 and current switch 126, the operations involved in the analogue-to-digital conversion of an assumed negative input voltage, now will be described.

*The comparison amplifier—Fig. 2*

As indicated above, negative start pulse 52 initiates the production of a clear pulse 164 which, among other things, triggers polarity flip-flop 271 into state "10" so that the output 205 of the plate of stage 206 is substantially at B+ and the output 207 of the plate of stage 208 is at a considerably lower predetermined potential. At the same time, the push-pull output 210, 211 at the last stage 220 of balance amplifier 272 from left plate 212 to right plate 214 has been rendered negative by negative input 20 as follows. Balance amplifier 272 includes three stages 216, 218 and 220 of push-pull amplification, each stage having a pair of plates connected to B+ through separate resistors, a pair of independent control grids and a pair of cathodes connected through a common resistor to ground. The operation of each stage is such that if the voltages on both grids are equal, both plates are at the same potential. But if the voltage on one grid rises, the resulting rise in voltage on the common cathode tends to decrease the current flow from the plate associated with the other grid. The result is that any difference in potential between the two grids results in a greatly amplified difference in potential between the two plates. Inasmuch as each stage is designed for high gain, a predeterminedly small difference in push-pull input to the grids of stage 216 results in saturation of the current flow through one side or the other side of stage 220.

*The subtract pulse generator—Fig. 2*

The D.C. push-pull output from balance amplifier 272 is combined with the D.C. push-pull voltage from the polarity flip-flop 24 by two resistance adders which, as indicated above, apply the two resulting outputs to subtract pulse generator 68.

Subtract pulse generator 68 includes a double input cathode follower 230 having a pair of grids to which the outputs of the resistance adders are applied, as at 232 and 234. The cathode of cathode follower 230, in common with the cathodes of a clamp 236 and a gate 238, is connected to ground through a resistor 240. In the absence of pulses 232 and 234, normal current through clamp 236 and resistor 240 maintains the cathodes of clamp 236, cathode follower 230 and gate 238 at a predetermined potential at which gate 238 does not conduct even though positive clock pulses 242 from the common cathodes of clock pulse generator 273 are applied to the control grid of gate 238. However, when there are voltage drops from output 210 to output 211 of balance amplifier 132 and from output 205 to output 207 of polarity flip-flop 24, less current flows through resistor 240 so that the cathode voltage decreases to a point at which positive clock pulse 62 causes gate 238 to conduct and a negative pulse to appear on subtract pulse line 142.

If input 20 had been positive, the push-pull voltage of balance amplifier 132 would have been positive from output 210 to output 211. Since at the start, the push-pull voltage of polarity flip-flop 24 from output 205 to output 207 is always positive, the resultant D.C. voltages 232 and 234 would maintain the current cathode follower 230 at a level at which the high cathode potential would prevent current flow through gate 238, notwithstanding application of positive clock pulse 62 to the control grid of gate 238. In consequence, no negative pulse would appear on subtract pulse line 142.

*The similarity of the polarity flip-flop and the sequencing flip-flops, the similarity of clock and subtract pulse gate No. 1 and gates Nos. 2 through 12, and the similarity of the current generators—Figs. 1 and 2*

The clock and subtract pulses initially produced by clock pulse generator 64 and subtract pulse generator 68, and transmitted through clock and subtract pulse gate 72, as indicated in reference to Fig. 1, determine the state of polarity flip-flop 24 for the remainder of the conversion and trigger sequencing flip-flop No. 1 to state "10." At this point, the polarity of input 20 is indicated by the state of polarity flip-flop 24 and the programmed comparison is initiated between input 20 and the sequence of voltages produced by current generators Nos. 1 through 12 under the control of clock and subtract pulses transmitted through gates Nos. 2 through 13 to sequencing flip-flops Nos. 1 through 12. These components are shown only in Fig. 1. Each of sequencing flip-flops Nos. 1 through 12 is similar in design to control flip-flop 54. Each of gates 2 through 13 is similar to clock and subtract pulse gate 72. Each of current generators Nos. 1 through 8 is a cathode follower including a precision resistor between its cathode and ground and having a precision voltage applied between its grid and the return end of the resistor. Current generators 9 through 12 are merely resistors of appropriate value connected between sequencing flip-flops 9–12 respectively and the current summing bus.

*The current switch—Fig. 2*

The comparison of the input voltage 20 and the prevailing voltage produced by the current generators is controlled by current switch 126. This is true by virtue of the fact that initially, i.e., after generation of clear pulse 66, no currents flow through either resistor 128 or resistor 130. Current switch 126 is a double input cathode follower gate. The left plate 247 of switch 126 is connected through resistor 128 to ground, the right plate 248 through resistor 130 to ground. Control grids 250 and 252 are coupled to the plates of stages 206 and 208, respectively, of polarity flip-flop 271. Cathodes 254 and 256 lead in common to current summing bus 100.

As indicated above, when input 20 is negative, the output of stage 208 of polarity flip-flop 24 is high, while the output of stage 206 is low. In consequence, a high potential is applied to grid 252 and a low potential to grid 250 of current switch 126. Therefore, the precision current flows from ground through resistor 130 of balance amplifier 132 and through plate 248 and cathode 256 of current switch 126 into current summing bus 100. On the other hand, when input 20 is positive, the output of stage 206 of polarity flip-flop 24 is greater than the output of stage 240 in consequence of which a high potential is applied to grid 252 and a low potential to grid 250 of current switch 126. Therefore, current flows from ground through resistor 128 of balance amplifier 132 and through plate 247 and cathode 254 of current switch 126 into current summing bus 100.

*The current summing bus voltage regulator and clamp—Fig. 2*

In order to prevent the flow of displacement currents resulting from the stray capacity between the current summing bus and ground, the current summing bus is kept at a constant voltage by a regulator 258 and a clamp 260. It will be noted that the cathode of regulator 258 is clamped at a predetermined potential by a gas regulator tube 262 and that the control grid of regulator 258 is coupled to current summing bus 100. Because the cathode voltage remains constant, a change in the potential of the control grid of regulator 258 is reflected by an opposite change in potential at its plate. This opposite change in potential is applied to the grid of clamp 260 which is a cathode follower. The output at the cathode of clamp 260 is applied to the grip of the conducting section of current switch 126 through either diode 264 or diode 268. In this way, sudden voltage changes in the current summing bus are opposed.

*Specific example of an analogue-to-digital conversion*

A clear understanding of the operation of balance amplifier 132 will be facilitated by a detailed consideration of the analogue-to-digital conversion of an assumed input of −14.76 volts (representing the digital number 738) where: resistors 120 and 130 each equals 2040 ohms; resistors 258, 260, 262, 264 and 266 each equals 100 kilohms; and the precision currents produced by the current generators are: generator No. 1, 4 ma.; Nos. 2 and 3, each 2 ma.; No. 4, 1 ma.; No. 5, .4 ma.; Nos. 6 and 7, each .2 ma.; No. 8, .1 ma.; No. 9, .04 ma.; Nos 10 and 11, each .02 ma.; and No. 12, .01 ma. The design of balance amplifier 132 is such that its output stage is completely saturated when the difference between its inputs exceeds 20 mv. Since the equivalent impedance from point 258 to ground is chosen to be 2 k., the voltage at point 258 is −8 v. when 4 ma. is introduced by current generator No. 1. Thus, when sequencing flip-flop No. 1 is in state "01," the net voltage from grid 244 to grid 246 resulting from the input of −14.76 volts and the internally generated −8 v. remains negative so that, in consequence, no subtract pulse is generated. The next clock pulse then triggers sequencing flip-flop No. 2 to state "01" whereby an additional 2 ma. is caused to flow in the current summing bus. The new voltage at point 258 is −12 v. so that the net voltage from grid 244 to grid 246 remains negative. In consequence, the third subtract pulse fails to occur and current generator No. 2 remains in the current generating state. The third clock pulse then triggers sequencing flip-flop No. 3 to state "01" so that an additional 2 ma. flow into the current summing bus. This results in −16 v. at point 258, which now is sufficient to change the polarity of the voltage from grid 244 to grid 246. Since this voltage, which is actually 0.62 v., exceeds 10 mv., the output stage of amplifier 132 switches so that subtract pulse generator 68 is in condition to respond to the next clock pulse. This clock pulse produces subtract pulse No. 4 which proceeds to return sequencing flip-flop No. 3 to state "10" and current generator No. 3 to its current-off state. In addition, the output of balance amplifier 132 returns to its original state. Clock pulse, No. 4, then results in the introduction of an additional 1 ma. into current summing bus 100 producing −14 v. at point 258. In the same manner as before, this current is made to remain on with the result that the final states of sequencing flip-flops 1 through 4 produce in the first matrix output the hundreds digit 7. The entire conversion continues in this way until the input voltage has been equaled to within ±20 mv. by introduction of appropriate currents in current summing bus 100. Thus, the input has been digitized and its polarity determined since the final state of all sequencing flip-flops Nos. 1 through 12 and polarity flip-flop 24 exactly represents it.

Since certain changes may be made in the above apparatus without departing from the scope of the invention herein involved, it is intended that all matter contained in the above description and shown in the accompanying drawing shall be integrated in an illustrative and not in a limiting sense.

What is claimed is:

1. A device for converting analogue indications to digital indications, said device comprising polarity flip-flop means for producing a signal representing the polarity of an analogue indication, a plurality of sequence flip-flop means for producing signals each representing a component of a digital indication, comparator means for producing a signal denoting whether the magnitude of said analogue indication or the magnitude of a sequence of predetermined reference signals is greater, clock means for generating a sequence of predeterminedly timed clock pulses, subtract means for generating subtract pulses in response to clock pulses selected under the control of said signal produced by said polarity flip-flop means and said signal produced by said comparator means, gate means for transmitting sequentially selected ones of said clock pulses and said subtract pulses to sequentially selected ones of said polarity flip-flop means and said sequence flip-flop means, current generator means for producing current of a magnitude dependent upon the states of said sequence flip-flop means, and current switch means controlled by said signal produced by said polarity flip-flop means for applying each of said reference signals to said comparator means.

2. A device for converting analogue indications to digital indications, said device comprising control flip-flop means for initiating a conversion by said device of an analogue indication to a digital indication, polarity flip-flop means triggered into a first state by said control flip-flop means, a plurality of sequence flip-flop means, comparator means for producing a signal denoting whether the magnitude of said analogue indication or the magnitude of a sequence of predetermined reference signals is greater, clock means for generating a sequence of predeterminedly timed clock pulses, subtract means for generating subtract pulses in response to clock pulses selected under the control of said signal produced by said polarity flip-flop means and said signal produced by said comparator means, gate means for transmitting sequentially selected ones of said clock pulses and said subtract pulses to sequentially selected ones of said polarity flip-flop means and said sequence flip-flop means, current generator means for producing currents of a magnitude dependent upon the states of said sequence flip-flop means, and current switch means controlled by said signal produced by said polarity flip-flop means for applying each of said reference signals to said comparator means, said sequence flip-flop means being triggered into first states by said clock pulses, selected ones of said polarity flip-flop means and said sequence flip-flop means being triggered into second states by said subtract pulses, whereby said polarity flip-flop means is caused to indicate the polarity of said analogue indication and said sequence flip-flop means are caused to provide a digital indication of said analogue indication.

3. The device of claim 2 wherein said comparator means includes an electronic valve having a pair of positive electrodes, a pair of control electrodes and common negative electrode means, said input signal being applied to one control electrode of said pair, said sequence of of predetermined reference signals being applied to the other control electrode of said pair, whereby the direction of the voltage drop between said control electrodes of said pair denotes whether the magnitude of said input signal or the magnitude of each of said sequence of predetermined reference signals is greater.

4. The device of claim 2 wherein said subtract pulse generating means includes a subtract pulse gate, said signal produced by said comparator means being push-pull, said signal produced by said polarity flip-flop means being push-pulls, said signal produced by said comparator means and said signal produced by said polarity flip-flop means being applied to a resistance matrix which produces a signal that determines when said gate last mentioned gate conducts.

5. The device of claim 2 wherein each of said gates includes an electronic valve having a positive electrode, a control electrode and a negative electrode, said negative electrode being clamped normally by a first rectifier at a predetermined low voltage, a first impedance, a second rectifier and a first inductor in series across said first rectifier, and a second impedance and a second inductor in series across said first rectifier, the polarity of said first rectifier being opposite to that of said second rectifier and said third rectifier, said control electrode being biased normally at a predetermined high potential, whereby a positive pulse applied to said control grid permits negative pulses to be transmitted through said second rectifier and said third rectifier.

6. The device of claim 2 wherein said current switch means includes an electron valve having a pair of positive electrodes, a pair of control electrodes respectively associated therewith and negative electrode means, and wherein said polarity flip-flop means includes an electron valve having a pair of positive electrodes, a pair of control electrodes respectively associated therewith, and negative electrode means, said positive electrodes of said polarity flip-flop means being coupled to said control electrodes of said current switch means.

7. The device of claim 2 wherein said comparator means includes an electronic valve having a pair of positive electrodes, a pair of control electrodes and common negative electrode means, said input signal being applied to one control electrode of said comparator means, said sequence of predetermined reference signals being applied to the other control electrode of said pair, whereby the direction of the voltage drop between said control electrodes of said pair denotes whether the magnitude of said input signal or the magnitude of said sequence of predetermined reference signals is greater, wherein said current switch means includes an electron valve having a pair of positive electrodes, a pair of control electrodes respectively associated therewith, and negative electrode means, and wherein said polarity flip-flop means includes an electron valve having a pair of positive electrodes, a pair of control electrodes respectively associated therewith, and negative electrode means, said positive electrodes of said polarity flip-flop means being coupled to said control electrodes of said current switch means, said currents of said magnitude dependent upon the states of said sequence flip-flop means being directed through one of said positive electrodes of said current switch means into a current summing bus in response to which of said positive electrode of said polarity flip-flop means is conducting.

8. The device of claim 7, wherein the potential of said current summing bus is kept substantially constant by a regulator, said regulator including a first electron valve having a negative electrode clamped at a predetermined potential, a control electrode coupled to said current summing bus, and a positive electrode whose potential varies in response to current flowing therethrough, and a second electron valve having a positive elcetrode at a substantially predetermined potential, a control electrode coupled to the positive electrode of said first electron valve, and a negative electrode coupled to said control electrodes of said current switch means.

9. A device for converting analogue indications to digital indications, said device comprising polarity flip-flop means for producing a signal representing the polarity of an analogue indication, a plurality of sequence flip-flop means for producing signals each representing a component of a digital indication, polarity gate means associated with said polarity flip-flop means, sequence gate means associated with said sequence flip-flop means, clock pulse generating means for applying a sequence of clock pulses to said polarity gate means and said sequence gate means, subtract pulse generating means for applying a sequence of subtract pulses to said polarity gate means and said sequence gate means, means for successively opening said polarity gate means and said sequence gate means in order to apply sequential clock pulses and subtract pulses to said polarity flip-flop means and said sequence flip-flop means, and means responsive to said signals produced by said polarity flip-flop means and said sequence flip-flop means for controlling the production of subtract pulses by said subtract pulse generating means.

10. The device of claim 9 wherein said last-mentioned means provides a current switch means which includes an electron valve having a pair of positive electrodes, a pair of control electrodes respectively associated therewith, and negative electrode means, and wherein said polarity flip-flop means includes an electron valve having a pair of positive electrodes, a pair of control electrodes respectively associated therewith, and negative electrode means, said positive electrodes of said polarity flip-flop means being coupled to said control electrodes of said current switch means.

11. The device of claim 9 wherein said last-mentioned means provides a comparator means and a current switch means, wherein said comparator means includes an electron valve having a pair of positive electrodes, a pair of control electrodes and common negative electrode means, said input signal being applied to one control electrode of said comparator means, said sequence of predetermined reference signals being applied to the other control electrode of said pair, whereby the direction of the voltage drop between said control electrodes of said pair denotes whether the magnitude of said input signal or the magnitude of said sequence of predetermined reference signals is greater, wherein said current switch means includes an electron valve having a pair of positive electrodes, a pair of control electrodes respectively associated therewith, and negative electrode means, and wherein said polarity flip-flop means includes an electron valve having a pair of positive electrodes, a pair of control electrodes respectively associated therewith, and negative electrode means, said positive electrodes of said polarity flip-flop means being coupled to said control electrodes of said current switch means, said currents of said magnitude dependent upon the states of said sequence flip-flop means being directed through one of said positive electrodes of said current switch means into a current summing bus in response to which of said positive electrode of said polarity flip-flop means is conducting.

12. The device of claim 11 wherein each of said gates includes an electronic valve having a positive electrode, a control electrode and a negative electrode, said negative electrode being clamped normally by a first rectifier at a predetermined low voltage, a first impedance, a second rectifier and a first inductor in series across said first rectifier, and a second impedance and a second inductor in series across said first rectifier, the polarity of said first rectifier being opposite to that of said second rectifier and said third rectifier, said control electrode being biased normally at a predetermined high potential, whereby a positive pulse applied to said control grid permits negative pulses to be transmitted through said second rectifier and said third rectifier.

13. The device of claim 3 wherein said last-mentioned means provides a comparator means, said comparator means including an electronic valve having a pair of positive electrodes, a pair of control electrodes and common electrode means, said input signal being applied to one control electrode of said pair, said sequence of predetermined reference signals being applied to the other control electrode of said pair, whereby the direction of the voltage drop between said control electrodes of said pair denotes whether the magnitude of said input signal or the magnitude of said sequence of predetermined reference signals is greater.

14. The device of claim 9 wherein each of said gates includes an electronic valve having a positive electrode, a control electrode and a negative electrode, said negative electrode being clamped normally by a first rectifier at a predetermined low voltage, a first impedance, a second rectifier and a first inductor in series across said first rectifier, and a second impedance and a second inductor in series across said first rectifier, the polarity of said first rectifier, said control electrode being biased normally at a predetermined high potential, whereby a positive pulse applied to said control grid permits negative pulses to be transmitted through said second rectifier and said third rectifier.

References Cited in the file of this patent

UNITED STATES PATENTS

| | | |
|---|---|---|
| 2,545,082 | Grosdorff | Mar. 13, 1951 |
| 2,545,083 | Grosdorff | Mar. 13, 1951 |
| 2,775,754 | Sink | Dec. 25, 1956 |
| 2,784,396 | Kaiser | Mar. 5, 1957 |
| 2,787,418 | MacKnight | Apr. 2, 1957 |
| 2,828,482 | Schumann | Mar. 25, 1958 |